(12) United States Patent
Chiloyan et al.

(10) Patent No.: US 7,076,536 B2
(45) Date of Patent: Jul. 11, 2006

(54) METHOD AND SYSTEM TO ACCESS SOFTWARE PERTINENT TO AN ELECTRONIC PERIPHERAL DEVICE AT AN ADDRESS BASED ON A PERIPHERAL DEVICE IDENTIFIER

(75) Inventors: John H. Chiloyan, Redmond, WA (US); Edward C. Giaimo, Bellevue, WA (US)

(73) Assignee: Microsoft Corporation, Redmond, WA (US)

(*) Notice: Subject to any disclaimer, the term of this patent is extended or adjusted under 35 U.S.C. 154(b) by 685 days.

(21) Appl. No.: 09/746,637

(22) Filed: Dec. 21, 2000

(65) Prior Publication Data

US 2002/0083228 A1    Jun. 27, 2002

(51) Int. Cl.
*G06F 15/177* (2006.01)
(52) U.S. Cl. ............... 709/220; 709/221; 709/222
(58) Field of Classification Search ........... 709/220, 709/221, 222, 245; 710/8, 10; 713/100; 719/321, 327
See application file for complete search history.

(56) References Cited

U.S. PATENT DOCUMENTS

| | | | |
|---|---|---|---|
| 5,428,748 A | | 6/1995 | Davidson et al. ......... 710/9 |
| 5,802,304 A | | 9/1998 | Stone ............. 395/200.57 |
| 5,809,287 A | * | 9/1998 | Stupek et al. ............ 703/22 |
| 5,870,610 A | * | 2/1999 | Beyda ................. 717/173 |
| 6,009,480 A | | 12/1999 | Pleso ................... 710/8 |
| 6,023,585 A | * | 2/2000 | Perlman et al. ......... 717/178 |
| 6,026,366 A | | 2/2000 | Grube .................. 705/10 |
| 6,081,850 A | | 6/2000 | Garney ................ 710/15 |
| 6,122,676 A | | 9/2000 | Brief et al. ............. 710/9 |
| 6,148,346 A | * | 11/2000 | Hanson ................ 719/321 |
| 6,178,468 B1 | * | 1/2001 | Rudd et al. ............ 717/175 |

(Continued)

FOREIGN PATENT DOCUMENTS

EP    0304540    4/1994

(Continued)

OTHER PUBLICATIONS

Universal Serial Bus Specification Revision 2.0, Apr. 27, 2000, Published online at http://www.usb.org/developers/data/usb_20zip, pp. 38, 243-274, 291, & 340

(Continued)

*Primary Examiner*—William C. Vaughn, Jr.
*Assistant Examiner*—Joseph Maniwang
(74) *Attorney, Agent, or Firm*—Ronald M. Anderson

(57) ABSTRACT

A method and system for using a peripheral device identifier obtained from a peripheral device to determine a network address from a database, or generate the network address based on the identifier. Information related to the peripheral device is obtained from a remote device at the network address. The method includes automatically transferring at least one identifier from the peripheral device to a host device when the peripheral device is connected to the host device. The step of transferring is preferably done during or after enumeration of the peripheral device, such as occurs when a USB device is connected to a computer. The identifier is used as an index to automatically determine a network address from a database on the host device or a remote device, or to automatically generate a network address. Then, communication occurs between the host device and a remote device or other source of the information indicated by the network address. For example, the host device may download a device driver for the peripheral device from the remote device or from another peripheral device connected to the host device indicated by the network address.

42 Claims, 8 Drawing Sheets

U.S. PATENT DOCUMENTS

| | | |
|---|---|---|
| 6,205,501 B1 | 3/2001 | Brief et al. .................. 710/100 |
| 6,249,825 B1 | 6/2001 | Sartore et al. .................. 710/8 |
| 6,266,809 B1 * | 7/2001 | Craig et al. .................. 717/173 |
| 6,389,495 B1 | 5/2002 | Larkey et al. .................. 710/8 |
| 6,424,424 B1 | 7/2002 | Lomas et al. .............. 385/1.14 |
| 6,473,854 B1 * | 10/2002 | Fleming, III .................... 713/1 |
| 6,523,083 B1 * | 2/2003 | Lin et al. .................... 711/103 |
| 6,607,314 B1 * | 8/2003 | McCannon et al. ........... 400/62 |
| 6,615,286 B1 * | 9/2003 | Chobotaro et al. ............. 710/8 |
| 6,668,376 B1 * | 12/2003 | Wang et al. ................. 717/178 |
| 6,694,354 B1 * | 2/2004 | Elg ............................. 709/217 |
| 6,725,260 B1 * | 4/2004 | Philyaw ...................... 709/220 |
| 6,728,787 B1 * | 4/2004 | Leigh .......................... 719/327 |
| 2002/0147795 A1 * | 10/2002 | Cantwell .................... 709/220 |

FOREIGN PATENT DOCUMENTS

| | | |
|---|---|---|
| WO | WO9850861 | 11/1998 |
| WO | WO0033232 | 6/2000 |

OTHER PUBLICATIONS

Microsoft Plug and Play Specification—Plug and Play Design Specification for IEEE 1394, Version 1.0c, Mar. 3, 1999, Published online at http://www.microsoft.com/hwdev/download/respec/1394PNP_10c.zip, pp. 6-8.

Universal Serial Bus Specification Revision 2.0, Apr. 27, 2000, Published online at http://usb.org/developers/data/usb_20.zip, pp. 38, 243-274, 291, & 340.

Microsoft Plug and Play Specification—Plug and Play Design Specification for IEEE 1394, Version 1.0c, Mar. 3, 1999, Published online at http://www.microsoft.com/hwdev/download/respec/1394PNP_10c.zip, pp. 6-8.

* cited by examiner

METHOD AND SYSTEM TO ACCESS SOFTWARE PERTINENT TO AN ELECTRONIC PERIPHERAL DEVICE AT AN ADDRESS BASED ON A PERIPHERAL DEVICE IDENTIFIER

FIELD OF THE INVENTION

The present invention generally relates to a method and system for accessing software and other materials pertaining to a peripheral device over a network, and more specifically, to accessing such software and other pertinent materials using a network address that is stored in a database or generated, the network address being associated with an identifier for the peripheral device.

BACKGROUND OF THE INVENTION

Most personal computers and many other types of computing devices such as game consoles, TV set-top boxes, industrial control equipment, and automotive equipment are designed to connect to different peripheral devices that expand the functionality of the computing device. Peripheral devices and computing devices typically employ communication standards that enable the host device to recognize the presence and identity of a connected peripheral device. These communication standards facilitate plug-and-play, which enables a computing device to automatically recognize a peripheral device and assign all of the resources that it requires without manual intervention. While older legacy personal computer peripheral devices and earlier versions of computer operating systems did not implement the convenience of plug-and-play, most peripheral devices currently sold for use with personal computers are plug-and-play compatible. In addition, newer personal computers and newer operating systems now being sold and many newer designs of peripheral devices provide for "hot" connection or disconnection of a Universal Serial Bus (USB) peripheral device while the computer is energized. For example, many computers and peripheral devices support the USB standard and have USB interfaces which provide for "hot" connection or disconnection. Specifically, when a newly connected USB device is enumerated by the operating system, a vendor identification (ID), a product ID, and other information are obtained from the peripheral device in device descriptor fields. Assuming that a USB-compliant peripheral device was previously installed on the computer (i.e., listed in a device registry and provided with an appropriate device driver), the computer can immediately begin using the peripheral device.

Currently, when a peripheral device is connected to a computer or other host device for the very first time, it is at times necessary to run a setup program to install any client application software used in connection with the peripheral device and to provide a driver for the peripheral device. Typically, a peripheral device driver and related application software are provided on a CD-ROM or floppy disk that is packaged with the peripheral device. Drivers for peripheral devices are not always provided with the operating system, particularly for peripheral devices sold after the operating system was released for sale. When a driver is not included with the operating system, a user must manually load or otherwise manually provide the driver, application software, and/or other material for the peripheral device. The interaction required by the user to initially install a peripheral device thus detracts from a quality user experience, because the initial installation of the peripheral device is not truly a "plug-and-play" operation.

Typically, when a new peripheral device is connected to a computer, the computer operating system detects the presence of the new peripheral, and then requests the user to insert the CD-ROM or other medium supplied with the peripheral device. Users are accustomed to this delay incurred before using a new product, but would clearly prefer to avoid it. Similarly, manufacturers of peripheral devices would prefer not to include CD-ROMs or floppy disks with their products, because of the costs involved. Producing and distributing CD-ROMs or other memory media shipped with a peripheral device represents a considerable expense to peripheral vendors for at least two reasons. One reason is the obvious cost of materials and packaging associated with providing tangible medium, such as CD-ROMs. In addition, scheduling production of CD-ROMs or floppy disks can delay shipment of the peripheral devices, or reduce the amount of software development time available. If changes to the device driver or other software that will be shipped with a new peripheral device are required late in the development cycle of the product, then CD-ROM production may be delayed until after hardware production of the peripheral is already complete. Besides delaying delivery of the peripheral devices, storing the completed peripheral devices in inventory while the CD-ROMs or floppy disks are being produced adds cost and delays revenue generation. Alternatively, to ensure CD-ROM and/or floppy disk production meets the expected peripheral hardware production and shipping schedules, software development may be cut short and development of additional features that might make the overall peripheral product more competitive and attractive in the marketplace may not occur. Vendors may even have to distribute updated software on another CD-ROM, or by other means, to correct bugs in the software or improve the functionality of software materials previously shipped with peripheral devices sold.

Updated device drivers and other materials are often available via the Internet, and many computers have either full-time connections or at least a dialup connection to the Internet. Thus, a peripheral vendor doesn't necessarily have to supply a CD-ROM or floppy disks with a peripheral device if a vendor instead requires users to obtain the materials by a download over the Internet. However, connecting to the Internet and/or downloading drivers and other materials is also a manual process that must be carried out by the user, and will normally require the user to enter an appropriate address for a manufacturer web site, and then search through various web pages until the appropriate web page is found to enable the download to occur. Such a manual process can be difficult for novice users, can delay the initial installation of a peripheral on a computer, and likely detracts from user satisfaction. Furthermore, a frequent problem with peripheral devices being reinstalled on a host computing device is that the user will have misplaced the CD-ROMs or floppy disks that were originally provided with the peripheral devices. Unless device drivers can be obtained from another source, it may not be possible to reinstall a peripheral device.

A novel alternative addressing these problems is for the peripheral manufacturer to provide a network address in a memory of the peripheral device for a site from which a device driver and/or other information pertinent to the peripheral device can be obtained. This alternative is disclosed in commonly assigned U.S. patent application, entitled "Method and System to Access Software Pertinent to an Electronic Peripheral Device Based on an Address Stored in a Peripheral Device," Ser. No. 09/760,327, filed on Jan. 12, 2001. In this alternative, the operating system reads the address from the peripheral device when the peripheral device is first connected to a host computing device, or when the host computing device is energized with the peripheral device connected to the host computing device for the first time. The operating system then automatically downloads the driver and/or other material from a web server or remote device accessed using the Internet address. However, this approach requires that the peripheral device store an address. Since peripheral devices currently do not store such a network address, existing or legacy peripheral devices could not utilize this novel alternative.

It would thus be desirable to provide another method applicable to existing peripheral devices, for automatically providing a network address for a site from which materials pertaining to a peripheral device that is connected to a host computing device can be obtained. Currently, there is no provision for accomplishing this function. The method should also avoid the need for substantial user manual interaction to load device drivers and install related software when connecting a peripheral device to a host computing device. Clearly, a system and method providing automated access over a network to the required drivers and other related software, for both new and older peripheral devices, will avoid the problems noted above.

SUMMARY OF THE INVENTION

The present invention is directed to a method and system for using at least one peripheral device identifier obtained from a peripheral device to determine a network address stored in a database, or generated by an algorithm. A remote device at the network address is accessed to obtain information related to the peripheral device. The method includes the step of transferring at least one identifier from the peripheral device to a host device. A network address is then automatically determined by the host device based on the identifier, enabling communication pertaining to the peripheral device to occur between the host device and a remote device, or other additional source, at the network address. For example, the host device may download a device driver for the peripheral device from the remote device. The method thus also preferably includes at least one of the steps of retrieving software and/or other material from the remote device at the network address, automatically executing a program, installing a device driver, installing an application program, displaying a Web page, registering a product, downloading documentation, downloading and installing firmware into the peripheral device, presenting help information, or accessing other material related to the peripheral device—all from the remote device accessed using the network address. Those skilled in the art will recognize that any number of items can be obtained and/or performed once the network address is determined from the peripheral device identifier.

The host device may detect when a peripheral device is newly connected to the host device by detecting a change in the number of peripheral devices connected, or by other automatic means. Alternatively, the user may manually notify the host device of the connection.

The step of transferring the identifier from the peripheral device is preferably accomplished during an enumeration process performed by the operating system when a peripheral device is connected to a computer. During the enumeration process the operating system queries a newly connected peripheral device to determine parameters of the peripheral device, such as those in a USB device descriptor. The device descriptor includes information such as a vendor identifier and a product identifier. The step of transferring the identifier from the peripheral device may also be performed after enumeration using functions that request and receive the device descriptor.

If the desired peripheral device identifier is an identifier other than those in the device descriptor, other functions may be used to request and receive the identifier, or an index thereto. For example, a string descriptor may encode an identifier, or a pointer to a location in a memory of the peripheral device at which the identifier is stored. Alternatively, a class request may be issued to the peripheral device for the identifier. As another alternative, a vendor-specific command or different command may be issued to obtain the identifier from the peripheral device.

The method also preferably includes the step of checking to determine whether the peripheral device was previously registered on the host device. If not, the step of looking for a network address in a database, or the step of generating a network address based on the peripheral device identifier is carried out. Alternatively, this check can be done after the host device has already determined the network address. In this case, the operating system decision determines whether to launch a task to access the network address, or to retrieve and install a device driver and/or other information, and/or perform any other task related to accessing the network address.

The step of determining a network address preferably includes the step of searching a database based on the identifier. The database may reside on the host device or at the remote device. Alternatively, the identifier can be used to generate a network address that includes the identifier, or is otherwise based on the identifier.

The step of enabling communication between the host device and remote device preferably includes the step of automatically retrieving data, machine instructions, a document, or other machine-readable material pertaining to the peripheral device from the remote device at the network address. Preferably, the method further includes the step of executing a setup program stored on the remote device that pertains to the peripheral device. The setup program can automatically install a device driver program for the peripheral device on the host device, automatically execute an application program pertaining to the peripheral device, and/or provide a link to the network address that a user can subsequently select to again connect to the remote site.

The method preferably further includes the step of automatically executing a browser function on the host device and automatically accessing the network address. Alternatively, the method includes the step of requesting permission of a user to execute a browser function on the host device in order to automatically access the network address. This step optionally includes the step of enabling a user to suppress further requests to execute a browser function on the host device and/or to automatically access the network address.

Another aspect of the present invention is directed to a system for automatically accessing information related to a peripheral device. The system includes the peripheral device storing at least one identifier. One embodiment of the system also comprises a host device, such as a personal computer, that includes a memory, a network interface, a processor, and an interface used for connecting with the peripheral devices. The host device connects in communication with a remote device over the network interface or via a peripheral interface. Preferably, the remote device is a server, but alternatively, it can comprise a non-volatile storage in which a database of network addresses is stored. The database of network addresses is employed to identify a network address for the remote device, based on an identifier obtained from the peripheral device, enabling information pertinent to the peripheral device, such as a device driver, to be obtained by the host device from the remote device. Alternatively, the remote device may be another peripheral device, such as an external storage device. The remote device can comprise another peripheral device, which may be useful for industrial, automotive, and other closed systems. In any case, the host device accesses the remote device using the network address to obtain data, machine instructions, a document, and/or other material pertaining to the peripheral device.

Another aspect of the present invention is directed to a machine-readable medium on which are stored machine-executable instructions that, when executed by a processor, generally cause the processor to perform the steps of the method described above.

BRIEF DESCRIPTION OF THE DRAWING FIGURES

The foregoing aspects and many of the attendant advantages of this invention will become more readily appreciated as the same becomes better understood by reference to the following detailed description, when taken in conjunction with the accompanying drawings, wherein.

DESCRIPTION OF THE PREFERRED EMBODIMENT

Exemplary Operating Environment

Figure 1:
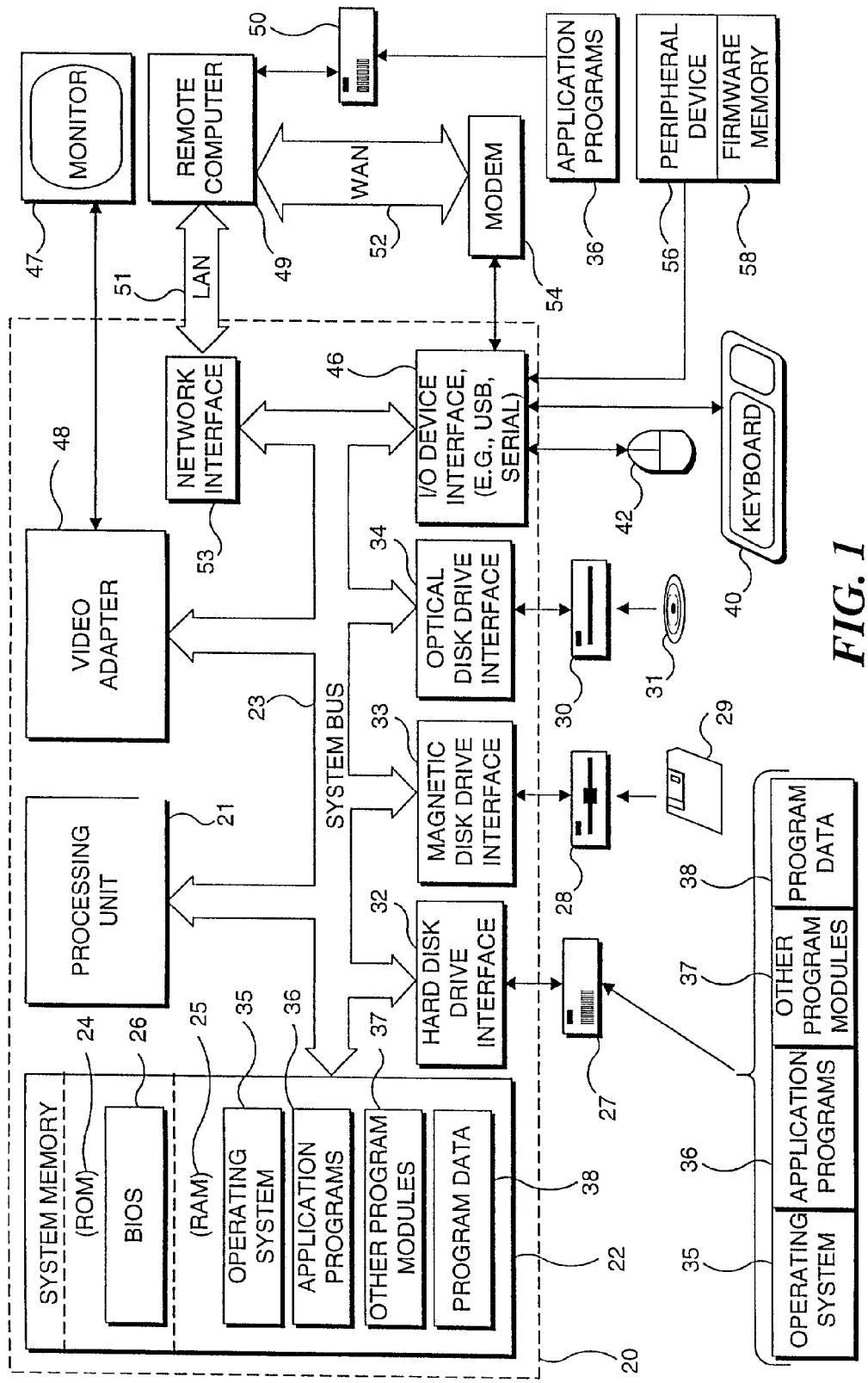
FIG. 1 is a schematic block diagram of an exemplary personal computer (PC) system suitable for implementing the present invention.

FIG. 1 and the following discussion are intended to provide a brief, general description of a suitable computing environment in which the present invention may be implemented, both in regard to a server that stores and provides Web pages and a client that requests the Web pages and displays them to a user. Although not required, the present invention will be described in the general context of computer-executable instructions, such as program modules that are executed by a personal computer. Generally, program modules include routines, programs, objects, components, data structures, etc. that perform particular tasks or implement particular abstract data types. Moreover, those skilled in the art will appreciate that this invention may be practiced with other computer system configurations, particularly in regard to a client device for displaying a Web page, including hand-held devices, pocket personal computing devices, digital cell phones adapted to connect to a network, microprocessor-based or programmable consumer electronic devices, game consoles, TV set-top boxes, multiprocessor systems, network personal computers, minicomputers, mainframe computers, industrial control equipment, automotive equipment, aerospace equipment, and the like. The invention may also be practiced in distributed computing environments where tasks are performed by remote processing devices that are linked through a communications network. In a distributed computing environment, program modules may be located in both local and remote memory storage devices.

With reference to FIG. 1, an exemplary system for implementing the present invention includes a general purpose computing device in the form of a conventional personal computer 20, provided with a processing unit 21, a system memory 22, and a system bus 23. The system bus couples various system components, including the system memory, to processing unit 21 and may be any of several types of bus structures, including a memory bus or memory controller, a peripheral bus, and a local bus using any of a variety of bus architectures. The system memory includes read-only memory (ROM) 24 and random access memory (RAM) 25. A basic input/output system (BIOS) 26, containing the basic routines that help to transfer information between elements within the personal computer 20, such as during start up, is stored in ROM 24. The personal computer 20 further includes a hard disk drive 27 for reading from and writing to a hard disk (not shown), a magnetic disk drive 28 for reading from or writing to a removable magnetic disk 29, and an optical disk drive 30 for reading from or writing to a removable optical disk 31, such as a CD-ROM or other optical media. Hard disk drive 27, magnetic disk drive 28, and optical disk drive 30 are connected to system bus 23 by a hard disk drive interface 32, a magnetic disk drive interface 33, and an optical disk drive interface 34, respectively. The drives and their associated computer-readable media provide nonvolatile storage of computer-readable machine instructions, data structures, program modules and other data for personal computer 20. Although the exemplary environment described herein employs a hard disk, removable magnetic disk 29, and removable optical disk 31, it will be appreciated by those skilled in the art that other types of computer-readable media, which can store data that is accessible by a computer, such as magnetic cassettes, flash memory cards, digital video disks, Bernoulli cartridges, random access memories (RAMs), read-only memories (ROMs), and the like, may also be used in the exemplary operating environment.

A number of program modules may be stored on the hard disk, magnetic disk 29, optical disk 31, ROM 24 or RAM 25, including an operating system 35 (with a browser function), one or more application programs 36, other program modules 37, and program data 38. A user may enter commands and information into personal computer 20 through input devices such as a keyboard 40 and a pointing device 42. Other input devices (not shown) may include a microphone, joystick, game pad, satellite dish, scanner, digital camera, or the like. These and other input devices are often connected to processing unit 21 through an input/output (I/O) device interface 46 that is coupled to the system bus. Output devices, such as a printer (not shown), may also be connected to processing unit 21 through an I/O device interface 46 that is coupled to the system bus. Similarly, a monitor 47 or other type of display device is also connected to system bus 23 via an appropriate interface, such as a video adapter 48, and is usable to display Web pages and/or other information. In addition to the monitor, personal computers are often coupled to other peripheral output devices (not shown), such as speakers (through a sound card or other audio interface—not shown). Such I/O devices are generally referred to as peripheral devices. For purposes of discussion in regard to the present invention, general peripheral device 56 is coupled to personal computer 20 via I/O device interface 46. The term I/O device interface is intended to encompass each interface specifically used for a serial port, a parallel port, a game port, a keyboard port, and/or a USB port. Through I/O device interface 46, information is communicated between peripheral device 56 and processing unit 21 via system bus 23. Peripheral device 56 includes firmware memory 58 for storing information. Firmware memory 58 may be erasable programmable read-only memory (EPROM), flash memory, magnetic storage, or other memory. Firmware memory 58 stores a vendor ID, a product ID, and/or other information related to the peripheral device 56.

Personal computer 20 may operate in a networked environment using logical connections to one or more additional sources, such as a remote computer 49. In regard to the present invention, the URI or address stored in the firmware memory of the peripheral device may specify a location that is accessed through remote computer 49. Remote computer 49 may be another personal computer, a server (which is typically generally configured much like personal computer 20), a router, a network personal computer, a peer device, another peripheral device, a satellite, or some other common network node, and typically includes many or all of the elements described above in connection with personal computer 20, although only an external memory storage device 50 has been illustrated in FIG. 1. The logical connections depicted in FIG. 1 include a local area network (LAN) 51 and a wide area network (WAN) 52. Such networking environments are common in offices, enterprise-wide computer networks, intranets, and the Internet.

When used in a LAN networking environment, personal computer 20 is connected to LAN 51 through a network interface or adapter 53. When used in a WAN networking environment, personal computer 20 typically includes a modem 54, or other means for establishing communications over WAN 52, such as the Internet. Modem 54, which may be internal or external, is connected to system bus 23, or coupled to the bus via I/O device interface 46, i.e., through a serial port. In a networked environment, program modules depicted relative to personal computer 20, or portions thereof, may be stored in the remote memory storage device. It will be appreciated that the network connections shown are exemplary and other means of establishing a communications link between the computers may be used, such as wireless communication and wide band network links.

Exemplary Implementation of the Present Invention

The following describes exemplary implementations of preferred embodiments utilizing plug-and-play technology, such as USB standards for communication between a personal computer 20 (shown in FIG. 1), acting as a host device, and a peripheral device, such as an input, output, or other device. Those skilled in the art will recognize that the details may be modified slightly for non-plug-and-play technologies and other forms of communication with peripheral devices, such as RS-232C serial, IEEE 1284 parallel, IrDA infrared, IEEE 1394 and other standards. However, USB will be used consistently in the following examples to simplify the discussion.

Figure 2:
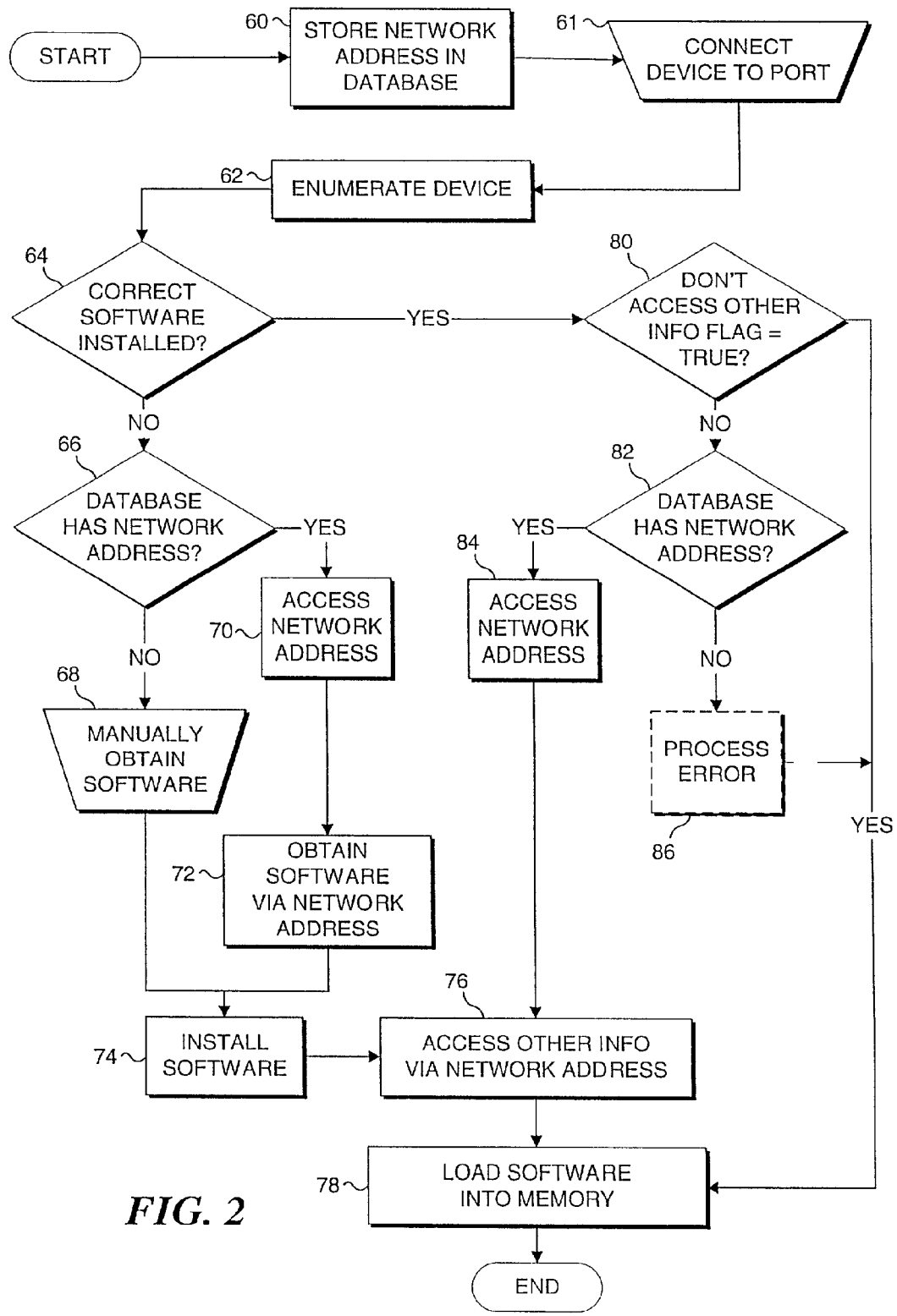
FIG. 2 is a flow diagram illustrating the logic of a preferred embodiment of the invention.

FIG. 2 illustrates the logic of an embodiment that installs a device driver, application software, or other material. Installing a device driver will be the primary example. At a step 60 a network address is stored in a database. Preferably, this network address identifies a location where the device driver and/or other material can be accessed. However, in another embodiment, the network address identifies a central location where a different address can be obtained, which identifies a location from which the device driver and/or other material is downloaded. Those skilled in the art will recognize that address redirection and/or branching can be extended further to create a series of successive links to a final terminal location where the device driver and/or other material is located and can be obtained. In one preferred embodiment, the terminal network address is stored in a database on host personal computer 20. However, as indicated above, another embodiment of the present invention stores the terminal network address in a database on an additional source, such as remote computer 49 (shown in FIG. 1).

At a step 61 a user connects a peripheral device to a USB I/O device interface 46 (shown in FIG. 1). Alternatively, step 61 may represent power being applied to host personal computer 20 with a peripheral device already connected. In yet another alternative, step 61 may not refer to a direct physical connection, but instead, to a remote or virtual connection, such as would occur by bringing a peripheral device that communicates over a wireless connection within infrared, radio frequency (RF), or other appropriate communication distance of host personal computer 20, depending upon the nature of the wireless communication implemented between the host computer and the peripheral device. Returning to a preferred USB embodiment, operating system 35 (shown in FIG. 1) detects and enumerates the new device at a step 62. During the enumeration process, operating system 35 queries the peripheral device for a device descriptor. The device descriptor preferably contains data fields relating to the peripheral device, including a vendor ID and a product ID.

Once these IDs are parsed from device descriptor fields, the network address can be determined from a database, or alternatively, can be generated based upon the IDs. In one embodiment, operating system 35 first determines at a decision step 64 whether a device driver and/or other software is already available on host personal computer 20. The operating system will typically check for the device driver among the system files in a predefined directory.

If the device driver and/or other software is already available on host personal computer 20, then operating system 35 simply loads the device driver and/or other software into memory 22 (shown in FIG. 1). Optionally, operating system 35 can perform a more detailed check by comparing IDs obtained from the device descriptor fields to the existing device driver and/or other software to see if the version numbers match or if the available version number is later than the version number referenced in the device descriptor fields. If the version numbers match or the available version is a more recent one, then operating system 35 loads the device driver and/or software into memory 22.

If the version numbers do not match, or if the available version is older, or if the device driver and/or other software is not even available on personal computer 20, then operating system 35 performs a decision step 66 to determine whether a corresponding network address is stored in the database. Further details of steps followed for making this determination are described below with regard to FIG. 3. Alternatively, the network address is generated from the IDs. For example, the identifier fields of the device descriptor can be mapped to an Internet Protocol (IP) address. Specifically, the device class is used for the first quad of the IP network address, the device subclass is used for the second quad, the product ID is used for the third quad, and the product ID is used for the fourth quad of the IP network address. Another approach is to generate an alphanumeric web address from the vendor ID name and the product ID model, e.g., www.<vendorIDname>.com/<modelIDname>/support.

If a network address is not stored in the database, or cannot be generated properly using the device descriptor fields, then the device driver and/or other software must be manually loaded at a step 68, as shown in FIG. 2. Manual loading typically involves inserting a storage medium, such as a CD-ROM, on which the device driver and/or software are stored, into a corresponding drive, or manually downloading the device driver and/or other software via the Internet, or following another procedure that requires user intervention or action. Manual loading may also be required if network communication is not available or if it is inactive. However, if a network address is stored in the database, then operating system 35 performs a step 70 to access the network address.

After accessing the network address via the network connection, e.g., a web page on a web server as specified by the network address accessed over a connection to the Internet, operating system 35 performs a step 72 to initiate download of the device driver and/or other software from a remote device at the network address. Again, if network communication is not available or not active, then the attempt to initiate download will fail, and manual intervention is required to load the device driver and/or other software. Preferably, however, network communication is available/active and downloading of the software and any other materials is accomplished by a file transfer request via hypertext transfer protocol (HTTP), file transfer protocol (FTP), wireless application protocol (WAP), or other communication technique.

Once received, the device driver and/or other software is installed on the host personal computer at a step 74. Installation may be completely automatic, or may be accomplished by a wizard program. When a driver or other material is first downloaded, it is preferred that a step 76 be performed to access other information relevant to the peripheral device at the site specified by the network address. For example, a vendor offer for additional equipment, supplies, or services can thus be displayed to a user. Finally, the device driver or other material is loaded into memory 22 at a step 78, and the peripheral device is ready for use.

If at decision step 66, the correct device driver or other software is already installed on the host personal computer, then a further series of steps might be undertaken to access the network address for other purposes. For example, the peripheral device vendor may desire that an advertising web page be displayed, or that other services be offered to the user, on the hope of generating further sales. However, it is also contemplated that the user will be given the option to suppress such additional displays or offers of products or services. Thus, a decision step 80 checks whether a flag has been set by the user to prevent any further attempts to access information at the network address. If so, the method goes directly to step 78 to load the driver software or other software. If, however, the flag is false, i.e., not set by the user, then the method proceeds to a decision step 82 to connect to the network address, or alternatively, to generate the network address. If no network address is found in the database and it cannot be generated from the peripheral device ID information, then operating system 35 optionally processes an error at a step 86 and continues to step 78 to load the software into memory. If a network address is found in a database, or has been generated based on the IDs, then the network address is accessed at a step 84 to obtain the other information noted at step 76. Again, the device driver or other previously installed software is loaded into memory 22 at step 78.

Figure 3:
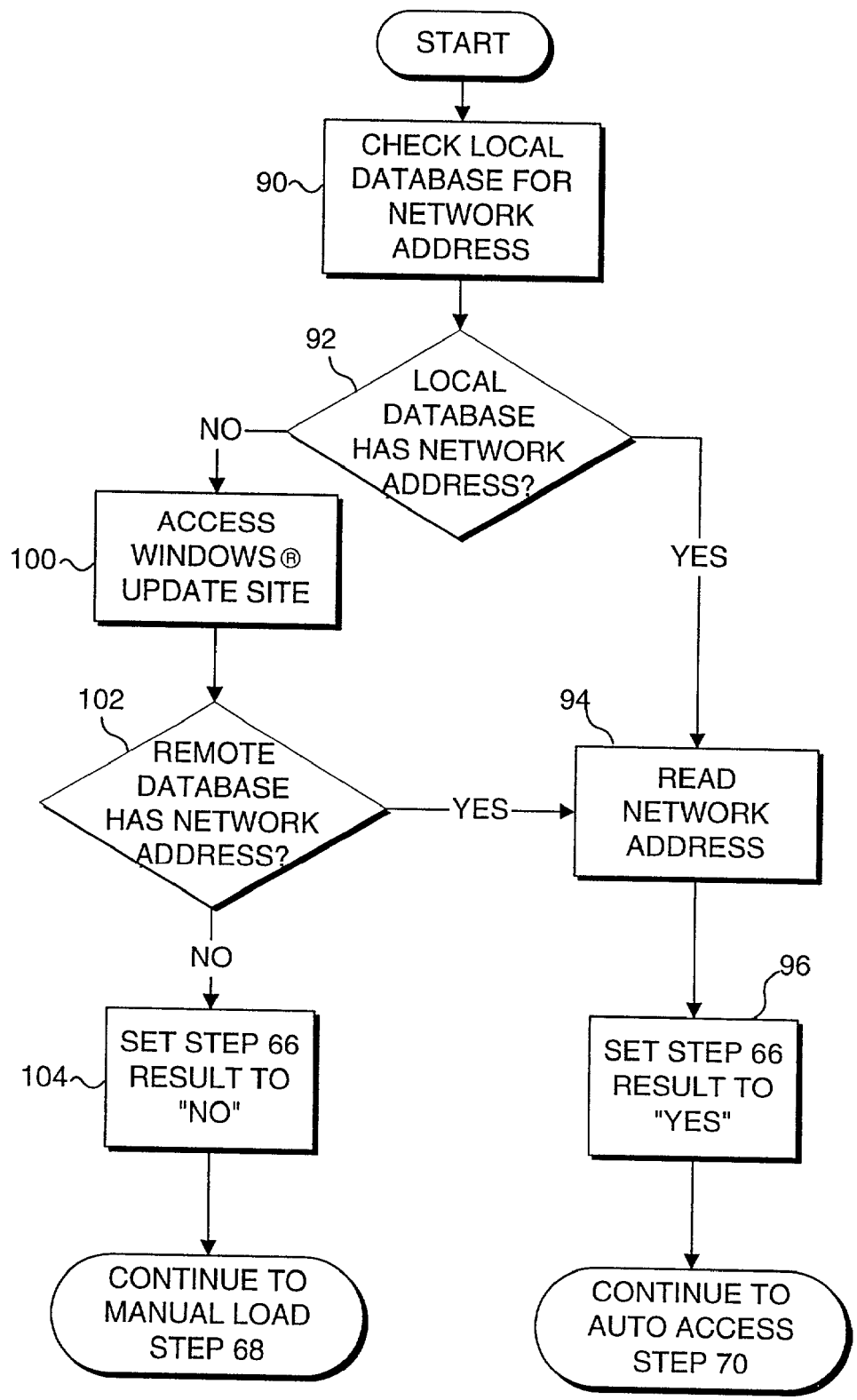
FIG. 3 is a flow diagram illustrating the logic of an embodiment for determining whether a network address, corresponding to a particular peripheral device, is stored in a database.

With respect to FIG. 3, a preferred embodiment is illustrated for determining whether a network address related to a particular peripheral device is stored in a database. During enumeration step 62 in FIG. 2, operating system 35 requests from the peripheral device a device descriptor that includes vendor and product IDs. At a step 90, operating system 35 then checks a local database for a network address, based on the identifiers. The database may be a part of the operating system files previously installed on the host personal computer and will then likely be updated from time to time, during periodic online updates of the operating system. The vendor ID and/or product ID will serve as indexes into the database to reference a network address related to the peripheral device. If at a decision step 92, operating system 35 determines that the local database includes a network address based on the IDs obtained from the peripheral device, then operating system 35 reads the network address into memory 22 of the host personal computer (or other host device) at a step 94. In this case, the result of the determination (of step 66) is set to "YES" at a step 96. With this result, the overall installation process continues with the automatic loading that occurs over the network at step 70.

If, however, no local database exists on the host personal computer or other host device, or if the local database does not include a network address indexed by the IDs obtained from the peripheral device, then the operating system accesses a remote database at a step 100. The remote database may be accessed at a predefined Microsoft Corporation WINDOWS® Update Web site, or at a different address indicating some other remote device with which communication is provided over the network. A decision step 102 determines whether a network address, indexed by the IDs obtained from the peripheral device, is stored in the remote database. This step may be accomplished by a request from operating system 35 directly to the remote database, or by a different remote database access procedure, as appropriate for the remote database. For example, the remote database can be queried via an active server page (ASP) or other server process. Those skilled in the art will recognize that a network address could alternatively be generated at the remote device, based upon the IDs obtained from the peripheral device. If a network address is found in the remote database, or remotely generated, then the network address is transferred to the host personal computer (or other host device) and stored in memory 22 at step 94. If, however, no remote database exists, or if the remote database does not include a network address indexed by the IDs obtained from the peripheral device, then the result of the overall determination (of step 66) is set to "NO" at a step 104. With that result, the installation process will continue with the conventional manual loading of device drivers and other software from a CD-ROM or floppy disk, at step 68.

Figure 4:
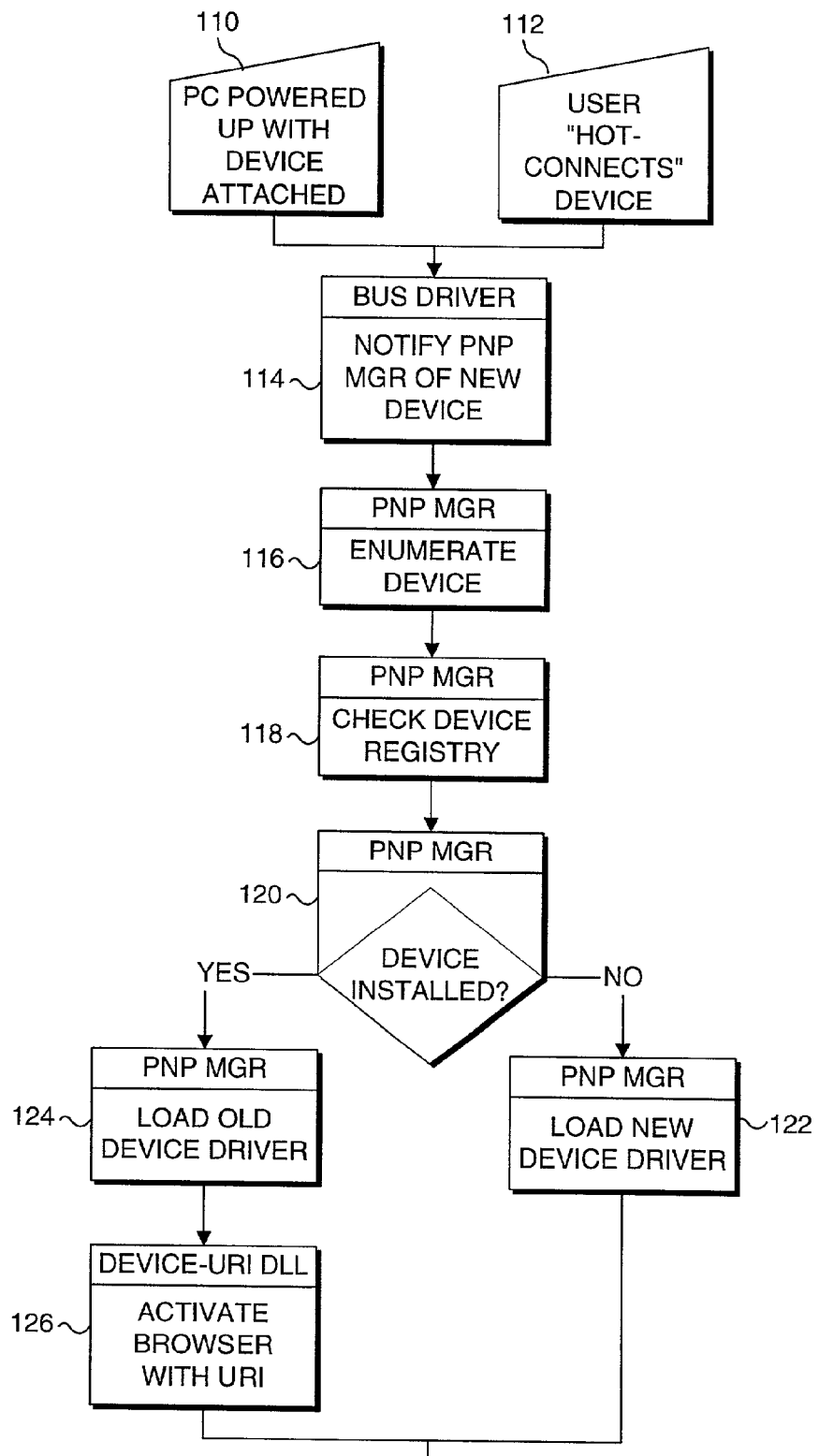
FIG. 4 is a flow diagram illustrating the logic of an embodiment that accesses a network address from a database using an identifier for the peripheral device.

Another detailed embodiment is illustrated in FIG. 4. This embodiment is based upon an inclusion of the present invention into the operating system. As noted above, steps 110 or 112 respectively occur when a user "hot-connects" a USB device to the USB port of a host device, or the host device is powered up with the peripheral USB device already connected. At a step 114, a Bus Driver program detects the new peripheral device and notifies a Plug-and-Play Manager program that the number of devices attached to the bus has changed. At a step 116 the Plug-and-Play Manager enumerates the device by sending I/O request packets (IRPs) to query the device for its IDs, which are provided in a device descriptor along with other device parameters. The detailed enumeration tasks are carried out by the Bus Driver program in partnership with the Plug-and-Play Manager program.

The Bus Driver program is typically a peripheral component interconnect (PCI) or personal computer memory card international association (PCMCIA) parent bus driver module. This enumeration process is similar to that described earlier, in that the Plug-and-Play Manager gathers information from the peripheral device, such as the vendor ID and product ID. Alternatively, the ID information is obtained via a class driver or vendor specific device (VSD) request. Also, the strings of ID information can alternatively be obtained directly from a known memory location in the peripheral device or from a location in the memory of the peripheral device that is indicated by a pointer obtained from the peripheral device. Encoding within the strings obtained from the peripheral device can distinguish the various types of information. For example, a forward slash symbol can be used to indicate a specific type of information or a command to treat the following characters as a specific type of information. Specifically, a slash T (/T) could indicate that the following characters are a title or text to display. A slash I (/I) could indicate instructions to the operating system. A slash S (/S) could indicate another string identifier. As before, the characters following one of these commands could be the actual string, for example, enclosed in quotation marks, or a pointer to a memory location where the string characters are stored.

Having obtained the peripheral device IDs and any other parameters from the peripheral device, the Plug-and-Play Manager examines a registry of previously installed peripheral devices at a step 118. At a decision step 120, the Plug-and-Play Manager determines whether the newly connected peripheral device has been previously installed. If not, the Plug-and-Play Manager executes an operation at a step 122 to load a new device driver. Conversely, if the peripheral device has been previously installed, the Plug-and-Play Manager loads the old device driver at a step 124. As discussed above, the Plug-and-Play Manager can still use the IDs obtained from the peripheral device to determine a URI and execute a Device-URI dynamic link library (DLL) at a step 126 to activate a browser or other function that will connect to a remote site using the URI.

Figure 5:
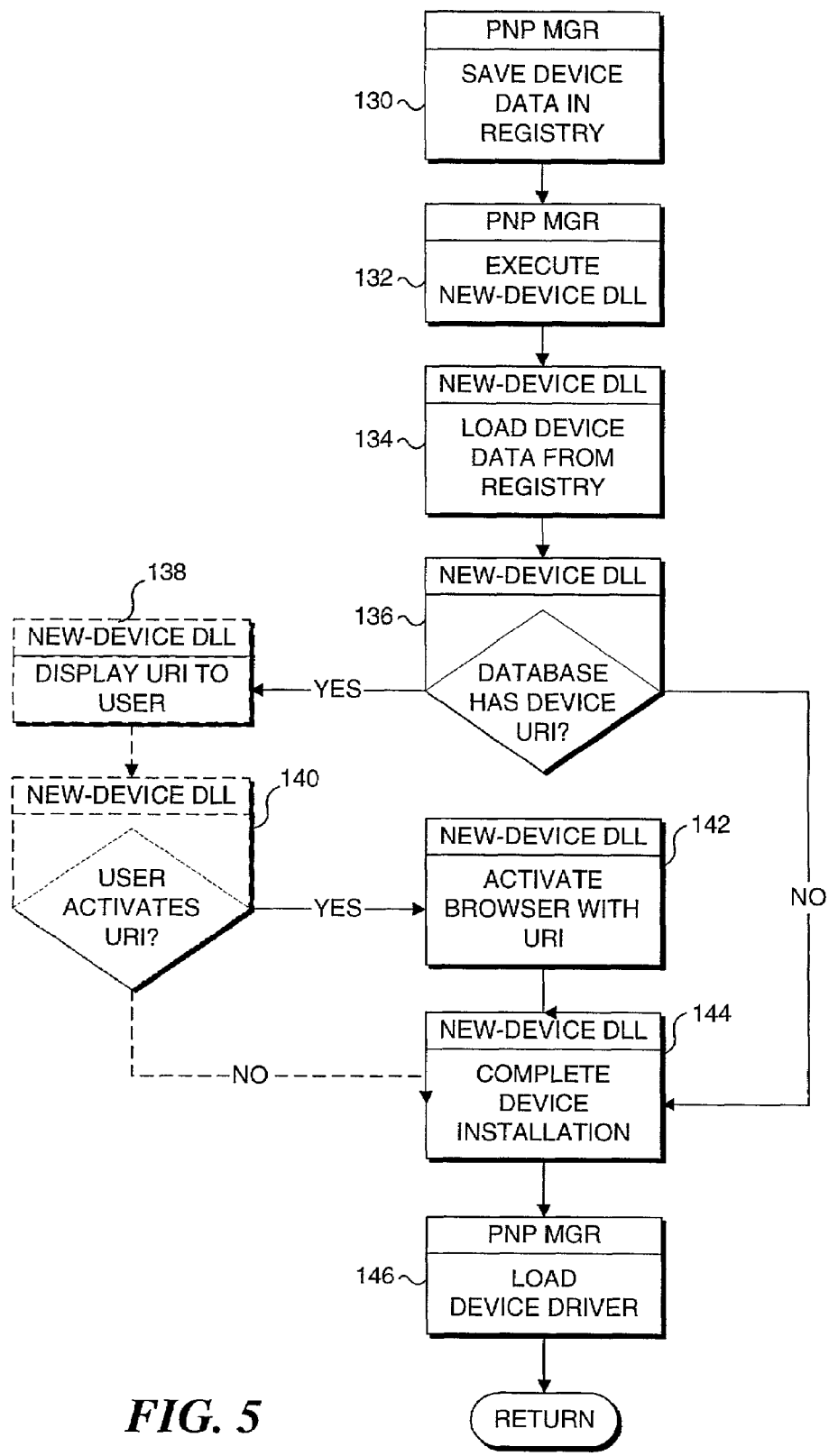
FIG. 5 is a flow diagram illustrating the logic of an embodiment that downloads a new device driver for a peripheral device from a Uniform Resource Indicator (URI) obtained from a database.

FIG. 5 illustrates details of the process for loading a new device driver, as indicated at step 122 in FIG. 4. In this process, the Plug-and-Play Manager first saves the device ID data, including the peripheral device string information, in the registry, as shown at a step 130. At a step 132, the Plug-and-Play Manager executes a New-Device DLL. At a step 134, this New-Device DLL loads the peripheral device IDs and other parameters from the registry. At a decision step 136, the New-Device DLL verifies whether a URI, indexed by the peripheral device IDs, exists in a local database on the host personal computer or other host device. If a URI from which the device driver can be obtained for the peripheral device is unavailable in the database, then installation must be completed manually by the user, using a conventional approach. If a URI indexed by the IDs obtained from the peripheral device is included in the database, then, optionally, the New-Device DLL displays the URI to the user at a step 138. Further optionally, the New-Device DLL enables the user to choose whether to activate access of the remote device indicated by the URI or simply proceed with the manual installation. If the user activates access of the remote device identified by the URI at a decision step 140, or if the access of the remote device at the URI is automatically activated, then the New-Device DLL activates a browser function at a step 142, with the URI included as the network address. The browser function accesses the remote site indicated by the URI, and the New-Device DLL obtains the device driver, other software, and/or information pertinent to the peripheral device.

Those skilled in the art will recognize that the URI could be for an active server page or other server side function that redirects to another URI, obtains the device driver directly, or performs another related function. Also, as described above, the URI can identify a file transfer protocol or other communication function used to obtain the device driver. Step 142 therefore can either transfer the device driver file and/or other material to host personal computer 20, or simply act as the location of an INF and other installation files, used by the New-Device DLL to install the peripheral device, as is done when a user manually identifies a location for a device driver or INF file. At a step 144, the New-Device DLL completes installation of the peripheral device with the downloaded device driver (or previously installed device driver). Once the best device driver is selected and installed on host personal computer 20, the Plug-and-Play Manager loads the device driver into memory 22 at a step 146, and enables active use of the peripheral device.

Figure 6:
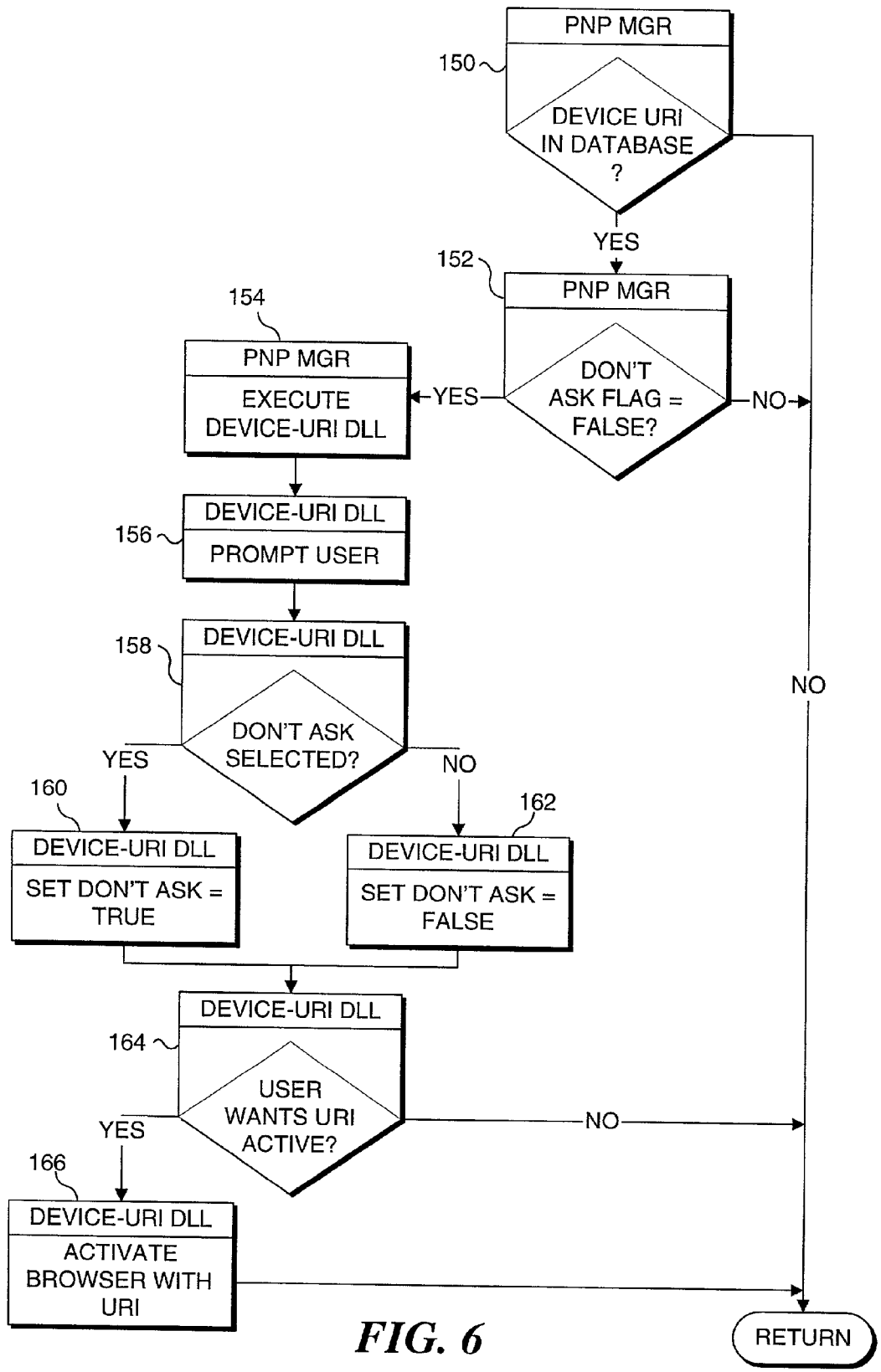
FIG. 6 is a flow diagram illustrating the logic of an embodiment that activates a browser function and navigates to a URI obtained from a database to obtain information pertaining to a peripheral device.

With reference to FIG. 6, the present invention can also be used to download and install an application program obtained from the remote device identified by the URI, display a web page accessed at the URI, download and install firmware into the peripheral device, or otherwise provide additional information or services available at the URI. To do so, the Plug-and-Play Manager verifies that the URI exists in the database at a decision step 150. If it does not, then this process does not continue, but instead returns to execution of a previous action. If a database that includes a URI indexed by the IDs obtained from the peripheral device does exist, a decision step 152 determines whether a flag has been set to refrain from prompting the user to activate the URI at subsequent times following an initial installation of the peripheral device. This is useful, for example, if the user prefers not to have an advertisement accessed at the URI displayed. If a "don't ask again" flag was previously selected by the user, then the user will not be prompted to activate the browser with the URI. Alternatively, the process can automatically activate a browser function with the URI loaded as the network address. However, the user will preferably be given the option to activate the browser function with the URI. If the "don't ask again" flag is false, meaning that the user has not yet selected the option, then the Plug-and-Play Manager executes a Device-URI DLL at a step 154.

At a step 156, the Device-URI DLL informs the user that the database contains a URI and prompts the user to indicate whether the user wishes to activate the URI. In this prompt the user also has the option of setting the "don't ask again" flag, i.e., by selecting a check box or radio button. A decision step 158 determines whether the user selected this option. If so, then the Device-URI DLL sets the "don't ask again" flag to true at a step 160. If unchecked, the Device-URI DLL sets the "don't ask again" flag to false at a step 162. At a decision step 164, the Device-URI DLL further determines whether the user elected to activate the URI. If not, then the process is complete. However, if so, the Device-URI DLL performs a step 166 to activate the browser function and navigate to the network address specified by the URI. As discussed earlier, the URI may display an advertisement, download and/or initiate an application program, download and install firmware into the peripheral device, provide help information, or provide other services and information.

Figure 7:
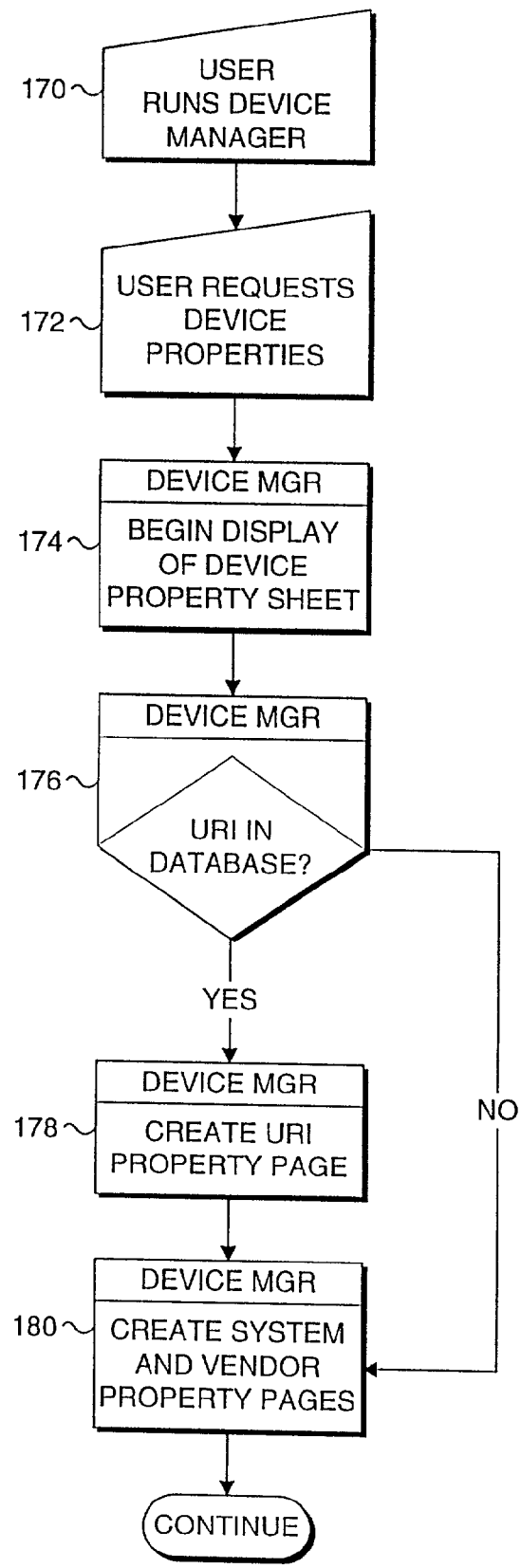
FIG. 7 is a flow diagram illustrating the logic employed for creating a peripheral device property page that includes a URI for display and activation by a user to subsequently access the remote site indicated by the network address.

FIG. 7 illustrates another embodiment that uses the URI obtained from the database. This embodiment enables operating system 35 to display the URI in a form such as a hyper-text link or shortcut on a properties page that the user can click to subsequently access the remote device identified by the URI. At a step 170, the user runs the Device Manager program available, for example, through the control panel of the WINDOWS® operating system. The Device Manager displays a list of all hardware devices connected to the host personal computer, including peripheral devices. The user clicks on an icon representing the desired peripheral device at a step 172 and selects an option to view the properties of that peripheral device. At a step 174, the device manager begins to display the device property sheet that has tabs to various pages of properties pertaining to the selected device. At a decision step 176, the device manager looks in the database for a URI that is based on at least one ID obtained from the peripheral device. If a URI exists in the database corresponding to the peripheral device, then the device manager creates a URI property page that displays the device URI in a string or other format that enables the user to subsequently click on the URI to activate a connection to the remote device indicated by the URI. This property page and the link that it includes to the URI enable a user to access the remote device at any later time. Preferably, a step 178 performs this operation by executing an Internet browser function and accessing the location specified by the URI. After the preceding step is completed, or if a URI is not found in the database, the device manager performs a step 180 in which a conventional system and/or vendor property pages are created for the peripheral device.

Figure 8:
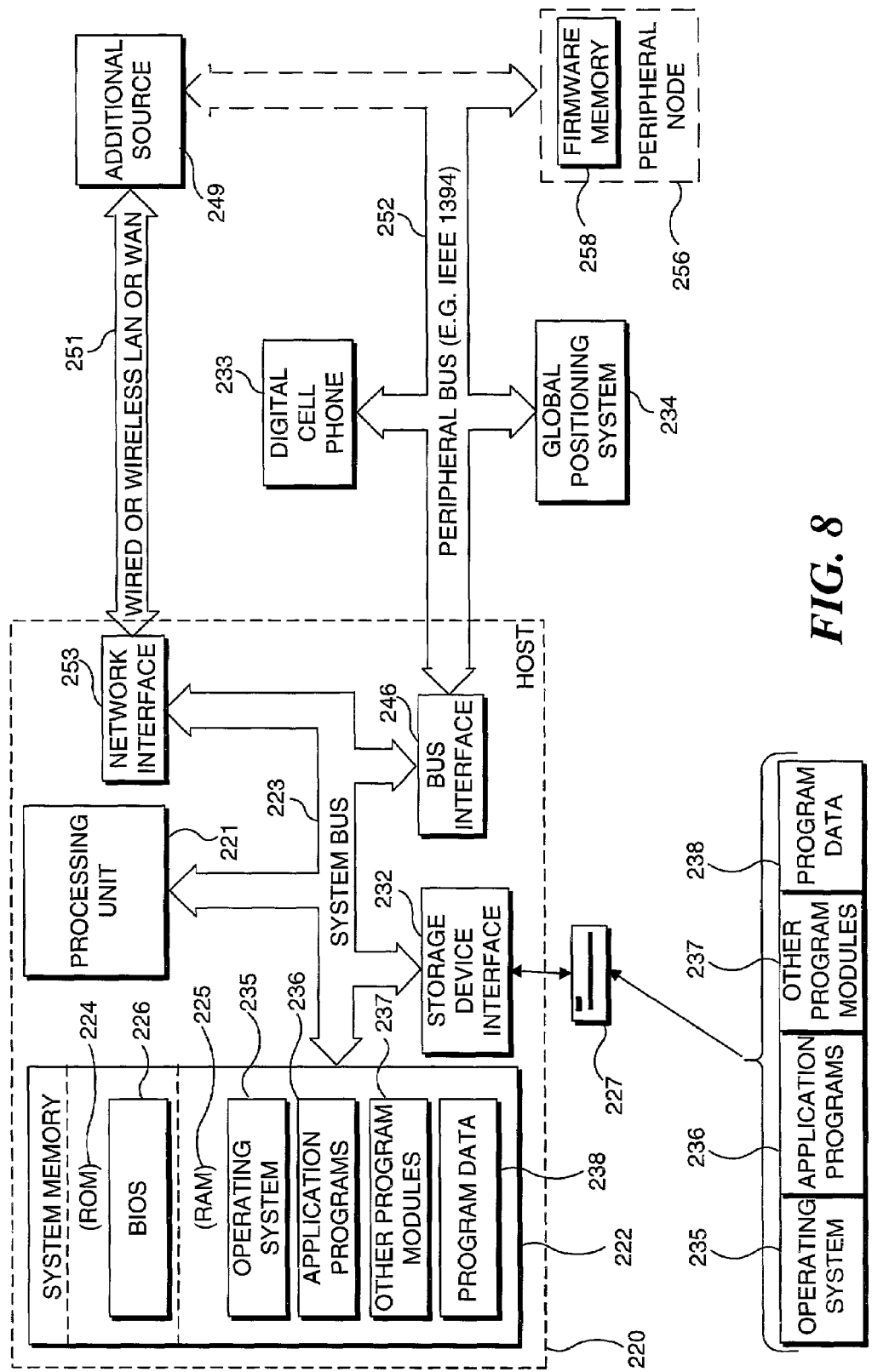
FIG. 8 is a schematic block diagram of an exemplary personal vehicle assistant (PVA) system suitable for implementing the present invention.

With reference to FIG. 8, an alternative exemplary system for implementing the present invention includes a special purpose computing device in the form of a personal vehicle assistant (PVA) 220. A PVA is similar in some respects to a personal data assistant (PDA), however, a PVA is optimized for use in a vehicle, such as an automobile. Microprocessors play an increasingly important role in the operation of modern vehicles and are used to control the operation of the vehicle, its lighting systems, entertainment systems, and more recently, are used for providing emergency assistance and navigation functions. Drivers have become dependent upon such sophisticated features in their vehicles to make driving time safer, more productive, and more enjoyable. The designs for vehicles currently being marketed, and for those under development, incorporate electronic features such as display screens, speakers and a remote microphone coupled to a cellular telephone, drives for digital navigation maps, and Web access. In a vehicle, there is a substantial expense in connecting each peripheral device to a PVA because of the need for routing individual wires for each peripheral device. To overcome this problem, a peripheral bus can be used that enables many peripheral devices to communicate with the PVA (and with each other) over a single set of wires.

Such peripheral buses are similar to other communication networks, but are typically limited by wire length, data rate, error handling capability, or other conditions. Thus, FIG. 8 illustrates an example for use in an automobile that utilizes a peripheral bus. Those skilled in the art will recognize that the exemplary embodiment shown in this Figure is also applicable to special purpose computing devices in other applications and fields, such as industrial programmable logic controllers, building management computers, flight control computers, and other computing or processor devices that interact with peripheral devices.

PVA 220 is provided with a processing unit 221, a system memory 222, a system bus 223, a storage device interface 232, a bus interface 246, and a network interface 253. Other components, such as a video adapter, a printer interface, or the like, may be optionally included in PVA 220, but are not shown in order to simplify the illustration. The system bus couples various system components, including the system memory, to processing unit 221 and may be any of several types of bus structures, including a memory bus or memory controller, a peripheral bus, and a local bus, using any of a variety of bus architectures.

The system memory includes ROM 224 and RAM 225. A BIOS 226, containing the basic routines used to transfer information between components within PVA 220, is stored in ROM 224. PVA 220 further interfaces with a storage device 227 for reading from and/or writing to a permanent or removable media. Storage device 227 is connected to system bus 223 by storage device interface 232. The storage device and its associated machine-readable media store machine instructions, data structures, program modules, and other data for PVA 220. It will be appreciated by those skilled in the art that numerous types of machine-readable media can be used to store data that is accessible by a processor, such as floppy disks, magnetic cassettes, flash memory cards, digital video disks, Bernoulli cartridges, RAMs, ROMs, and the like. A number of program modules may be stored on the machine-readable media, including an operating system 235 (with a browser function), one or more application programs 236, other program modules 237, and program data 238.

PVA 220 communicates with peripheral devices via bus interface 246 and peripheral bus 252. Peripheral bus 252 may be an IEEE 1394 bus, an ISO 11898 bus (e.g., a BOSCH™ Controller Area Network), or other type of bus. Those skilled in the art will recognize that numerous other peripheral buses exist in other fields in which the present invention can be employed, such as in the industrial manufacturing field, which may use an EN 50170 bus (e.g., a Profibus bus), an ISA SP50 bus (e.g., a Fieldbus Foundation bus) for smart peripherals; or in the aerospace field, which uses an ARINC™ bus for line-replaceable units. In some applications, it may also be possible to simply extend system bus 223.

Note that in a conventional prior art operating system, it is common to designate a specific directory to search for a device driver usable with a newly attached peripheral device. In contrast, the present invention requires that the operating system search the database for the location of the device driver, and the location or address of the device driver is found in the database using the ID of the peripheral device.

Connected to peripheral bus 252 in the example shown are a digital cell phone 233 and a global positioning system 234. Other peripheral devices connected to peripheral bus 252 may include typical peripheral devices that are currently incorporated into automobiles, such as compact disk players, digital video disk players, etc. Additional source 249 could provide direct access to device drivers or other material when they are connected to peripheral bus 252. The new connection of a peripheral device can occur during initial production, during maintenance at a service station, or at other times after a vehicle has been placed into service.

As generally indicated above, each peripheral device connected to peripheral bus 252 is a peripheral node 256, and includes firmware memory 258 for holding information. Firmware memory 258 may be EPROM, flash memory, magnetic storage, or other types of memory. Firmware memory 258 stores a vendor ID, a product ID, and/or other information related to peripheral node 256.

As before, the URI or address stored in the firmware memory of the peripheral node can specify a location where additional source 249 can be accessed. Additional source 249 may be another PVA, an external server (which might be generally equivalent to personal computer 20), a router, a network personal computer, a peer peripheral device, a satellite, or another common network node.

Like personal computer 20, PVA 220 operates in a networked environment using logical connections to one or more devices via a network interface 253 and a network 251. Network 251 may be a wireless network for mobile communication, or a wired network for communication at the manufacturing site, a service station, a fleet station, or a residence. Whether wireless or wired, network 251 may be a wide area network (WAN), a local area network (LAN), or some other type of communication network. Such networking environments are commonly used for digital cellular telephones, global positioning systems, emergency roadside assistance systems, shipping fleet communications, and the Internet. Network 251 enables the PVA 220 to communicate with remote sources, such as additional source 249. It will be appreciated that the network connections shown are exemplary, and other means of establishing a communication link may be used, such as a conventional modem.

Accessing information related to peripheral node 256 from additional source 249 is accomplished in much the same manner as described above for the USB embodiment. However, enumeration and other communication with peripheral node 256 is done through intervening peripheral bus 252, which simply adds a shared layer of communication between processor 221 and peripheral node 256.

When a new peripheral node is connected to peripheral bus 252, operating system 235 enumerates the new node generally as described above in connection with the USB embodiment. However, when a new peripheral node is connected to peripheral bus 252, bus interface 246 must first establish a peripheral bus address for the new peripheral node. In the USB embodiment, an address is known for the USB port to which the new device is connected. By contrast, only the peripheral bus is connected to a port on the PVA. Thus, an intervening bus address for each peripheral node must be established before the new node can be enumerated. As mentioned, this step is accomplished in accord with the well-known standards applicable to the particular peripheral bus employed.

For example, when a new node is connected to an IEEE 1394 peripheral bus, the bus resets itself completely, and all the peripheral nodes communicate among themselves to determine a new bus address for each peripheral node connected to the bus. The bus addresses are digits from zero to n−1, where n is the number of peripheral nodes. Then, PVA 220 enumerates each peripheral node on the peripheral bus, including peripheral node 256. Each peripheral node contains a bus information block similar to a device descriptor in USB. The third and fourth quadlets of the bus information block include a globally unique device ID. Alternatively, as with USB, a textual descriptor with an identifier can be stored in a unit directory outside the bus information block at another location in firmware memory 258. This textual descriptor can be obtained during or after enumeration.

Once the peripheral node has been enumerated or the device identifier otherwise obtained from peripheral node 256, the remaining steps of the method for obtaining a URI from a database, or generating a URI, and then accessing the URI and information pertaining to the peripheral node, are substantially the same as explained above, in connection with the USB embodiment.

Although the present invention has been described in connection with the preferred form of practicing it and modifications thereto, those of ordinary skill in the art will understand that many additional modifications can be made thereto within the scope of the claims that follow. Accordingly, it is not intended that the scope of the present invention in any way be limited by the above description, but instead be determined entirely by reference to the claims that follow.

The invention in which an exclusive right is claimed is defined by the following:

1. A method of accessing information related to an installation of a peripheral device connected to a host device, comprising the steps of:
   (a) obtaining from the peripheral device at least one identifier identifying the peripheral device;
   (b) determining a network address based on said at least one identifier;
   (c) in response to a request that is automatically generated initially to facilitate the installation, executing a browser function on the host device to access the remote device at the network address to obtain information required for the use of the peripheral device by the host device; and
   (d) enabling a user to suppress further automatically generated requests to execute a browser function on the host device, to access the network address to obtain information not essential for the use of the peripheral device by the host device, wherein said automatically generated requests are not initiated by the user.

2. The method of claim 1, wherein the step of obtaining occurs automatically when the host device detects a change in a number of peripheral devices connected to the host device.

3. The method of claim 1, wherein the step of obtaining occurs automatically when a user manually provides an indication to the host device that the peripheral device is connected to the host device.

4. The method of claim 1, wherein the step of determining comprises the steps of employing said at least one identifier as at least a portion of the network address.

5. The method of claim 1, wherein the step of obtaining comprises the steps of:
   (a) issuing a request to the peripheral device for a device descriptor;
   (b) receiving the device descriptor from the peripheral device; and (c) parsing the device descriptor to determine said at least one identifier.

6. The method of claim 1, wherein the step of obtaining comprises the steps of:
(a) issuing a request to the peripheral device for a string descriptor comprising said at least one identifier;
(b) receiving the string descriptor from the peripheral device; and
(c) parsing the string descriptor to determine said at least one identifier.

7. The method of claim 1, whereby the step of obtaining comprises the steps of:
(a) issuing a Class request to the peripheral device for at least one identifier; and
(b) receiving said at least one identifier.

8. The method of claim 1, whereby the step of obtaining comprises the steps of:
(a) issuing a Vendor Specific Device request to the peripheral device for said at least one identifier; and
(b) receiving said at least one identifier from the peripheral device.

9. The method of claim 1, wherein the step of determining a network address comprises accessing a database that includes a plurality of network addresses, using said at least one identifier to find the network address in the database.

10. The method of claim 9, wherein the database is stored on the host device.

11. The method of claim 9, wherein the database is stored on a device that is accessible by the host device.

12. The method of claim 1, wherein the step of determining a network address comprises the step of generating a network address based on said at least one identifier.

13. The method of claim 1, wherein the step of executing a browser function comprises the step of automatically retrieving at least one of data, machine instructions, and a document pertaining to the peripheral device from the remote device using the network address.

14. The method of claim 1, further comprising the step of using the browser function for automatically downloading a setup program that is stored on the remote device and pertains to the peripheral device.

15. The method of claim 14, further comprising the step of automatically executing the setup program that was downloaded to the host device to install software on the host device pertaining to the peripheral device.

16. The method of claim 1, further comprising the step of executing the browser function to obtain a device driver for the peripheral device that is automatically installed on the host device.

17. The method of claim 1, further comprising the step of using the browser function to automatically download an application program that is stored on the remote device and pertains to use of the peripheral device by the host device.

18. The method of claim 1, further comprising the step of using the browser function to automatically download and install firmware into the peripheral device.

19. The method of claim 1, further comprising the step of creating a link to the network address that a user can subsequently select to later communicate with the remote device.

20. The method of claim 1, wherein the step of executing the browser function comprises the step of using the browser function on the host device to automatically access the remote device at the network address.

21. The method of claim 1, further comprising the step of enabling a user to selectively execute a browser function on the host device to automatically access the remote device at the network address.

22. The method of claim 1, further comprising the step of periodically updating the database to add and change network addresses pertaining to peripheral devices, each network address being accessed based upon at least one identifier obtained from a peripheral device.

23. A computer-readable media, storing computer-readable machine instructions that when executed by a processor, cause the processor to implement steps (a) through (c) of claim 1.

24. A system for automatically accessing information related to an installation of a peripheral device, comprising:
(a) a peripheral device in which is stored at least one identifier;
(b) a remote device adapted to communicate over a network; and
(c) a host device comprising:
  (i) a memory in which are stored machine instructions;
  (ii) a network interface adapted to communicate with the remote device over the network; and
  (iii) a processor; said processor executing the machine instructions stored in the memory, to carry out a plurality of functions, including:
    (1) communicating with the peripheral device to obtain at least one identifier identifying the peripheral device;
    (2) determining a network address based on said at least one identifier;
    (3) in response to a request that is automatically generated initially to facilitate the installation, executing a browser function on the host device to access the remote device at the network address to obtain information required for the use of the peripheral device by the host device; and
    (4) enabling a user to suppress further automatically generated requests to execute a browser function on the host device, to access the network address to obtain information not essential for the use of the peripheral device by the host device wherein said automatically generated requests are not initiated by a user.

25. The system of claim 24, wherein said machine instructions further cause the processor to:
(a) issue a request to the peripheral device for a device descriptor;
(b) receive the device descriptor from the peripheral device; and
(c) parse the device descriptor to determine said at least one identifier.

26. The system of claim 24, wherein said machine instructions further cause the processor to:
(a) issue a request to the peripheral device for a string descriptor comprising said at least one identifier;
(b) receive the string descriptor from the peripheral device; and
(c) parse the string descriptor to determine said at least one identifier.

27. The system of claim 24, wherein said machine instructions further cause the processor to:
(a) issue a Class request to the peripheral device for at least one identifier; and
(b) receive the string descriptor from the peripheral device.

28. The system of claim 24, wherein said machine instructions further cause the processor to:
   (a) issue a Vendor Specific Device request to the peripheral device for said at least one identifier; and
   (b) receive said at least one identifier from the peripheral device.

29. The system of claim 24, wherein said machine instructions further cause the processor to determine a network address by accessing a database that includes a plurality of network addresses, using said at least one identifier to find the network address in the database.

30. The system of claim 29, wherein said database is stored by the host device.

31. The system of claim 29, wherein said database is stored by a device that is accessible by the host device.

32. The system of claim 24, wherein said machine instructions further cause the processor to generate a network address based on said at least one identifier.

33. The system of claim 24 wherein said machine instructions further cause the processor to automatically retrieve at least one of data, machine instructions, and a document pertaining to the peripheral device from the remote device using the network address.

34. The system of claim 24, wherein said machine instructions further cause the processor to automatically download a setup program that is stored on the remote device and pertains to the peripheral device.

35. The system of claim 34, wherein said machine instructions further cause the processor to automatically execute the setup program that was downloaded to the host device, to install software on the host device pertaining to the peripheral device.

36. The system of claim 24, wherein said machine instructions further cause the processor to automatically install a device driver for the peripheral device on the host device.

37. The system of claim 24, wherein said machine instructions further cause the processor to automatically download an application program that is stored on the remote device and pertains to use of the peripheral device by the host device.

38. The method of claim 24, wherein said machine instructions further cause the processor to automatically download and install firmware into the peripheral device.

39. The system of claim 24, wherein said machine instructions further cause the processor to create a link to the network address that a user can subsequently select to later communicate with the remote device.

40. The system of claim 24, wherein said machine instructions further cause the processor to automatically execute a browser function on the host device to automatically access the remote device at the network address with the browser function.

41. The system of claim 24, wherein said machine instructions further cause the processor to enable a user to selectively execute a browser function on the host device to automatically access the remote device at the network address, to display a web page indicated by the network address.

42. The system of claim 24, wherein said machine instructions further cause the processor to periodically update a database that includes a plurality of network addresses, to add and change network addresses pertaining to peripheral devices, each network address being indexed using at least one identifier obtained from a peripheral device.

* * * * *